(12) United States Patent  
Hoshihara et al.

(10) Patent No.: US 6,659,257 B2  
(45) Date of Patent: Dec. 9, 2003

(54) TORQUE TRANSMISSION DEVICE

(75) Inventors: Naoaki Hoshihara, Obu (JP); Kazunari Miyaki, Takaoka (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/156,024

(22) Filed: May 29, 2002

(65) Prior Publication Data

US 2002/0185356 A1 Dec. 12, 2002

(30) Foreign Application Priority Data

May 29, 2001 (JP) .......................................... 2001-160471

(51) Int. Cl.⁷ ............................................... F16H 57/10
(52) U.S. Cl. ....................................................... 192/223
(58) Field of Search ............................ 192/223, 15, 16; 297/374

(56) References Cited

U.S. PATENT DOCUMENTS

| 3,414,095 | A | * | 12/1968 | Kalns ........................... 192/223 |
| 3,976,172 | A | * | 8/1976 | F'Geppert ................. 192/223.1 |
| 4,235,319 | A | * | 11/1980 | Vazquez Rubianes ....... 192/223 |
| 5,460,253 | A | | 10/1995 | Ritter et al. |
| 6,224,157 | B1 | * | 5/2001 | Di Luccio ................... 297/362 |

FOREIGN PATENT DOCUMENTS

DE             41 20 617 A1     12/1992

* cited by examiner

*Primary Examiner*—Richard M. Lorence  
(74) *Attorney, Agent, or Firm*—Burns, Doane, Swecker & Mathis, LLP

(57) ABSTRACT

A torque transmission device which can rotate an output shaft for transmitting the rotation from the operation side to he device and cannot rotate the output shaft form the device side. The torque transmission device excels in the durability with less wear-out by preventing the generation of the load concentration by the line contact of each component.

15 Claims, 3 Drawing Sheets

TORQUE TRANSMISSION DEVICE

This application is based on and claim priority under 35 U.S.C. §119 with respect to Japanese Application NO. 2001-160471 filed on May 29, 2001, the entire content of which is incorporated herein by reference.

FIELD OF THE INVENTION

This invention generally relates to a torque transmission device. More particularly, the present invention pertains to a torque transmission device which is applied as an operational force transmission mechanism of a window regulator and a height adjustment device of a vehicle seat, in which an output shaft can be rotated for transmitting the rotation from the operation side to the device and the output shaft cannot be rotated from the device side.

BACKGROUND OF THE INVENTION

A known torque transmission device for achieving foregoing characteristics is disclosed in U.S. Pat. No. 5,460,253. The known torque transmission device according to the U.S. Pat. No. 5,460,253 includes an inside ring connected to a fixed member, an outside ring positioned keeping a clearance from the inside ring, two pairs of rollers positioned in the clearances between the outside ring and the inside ring, a spring positioned between the pair of rollers for increasing the distance between the rollers, a pawl portion inserted from a hole provided on a side wall of the outside ring for sandwiching the pair of rollers from the different side from the spring, an operation lever rotatably supported on a circumference of the inside ring, and a shaft fixed to the outside ring and positioned to be penetrated into a bore of the inside ring. The clearance between the inside ring and the outside ring includes a gradually narrowed portion. The spring provided between the pair of rollers pushes each roller towards the narrowed clearance. According to the torque transmission device with this construction, the large load is generated between the rollers and the inside ring and the outside ring by the wedge effect to obtain the large frictional force accompanied with the load. Thus, the relative rotation between the inside ring and the outside ring is checked strongly. When the torque transmission device with the foregoing construction is assembled to an application device for providing the rotational torque, a stress on the shaft of the torque transmission device is caused by a gear of the application device. The rotational torque is transmitted from the shaft to the outside ring, notwithstanding, the shaft is not rotated because the relative rotation between the outside ring, the roller, and the inside ring is strongly checked and the inside ring is connected to the fixed member.

On the other hand, when the operational lever is operated, the pawl portion displaces the roller to be released from the condition sandwiched in the clearance between the inside ring and the outside ring against the biasing force of the spring. The operational lever also has a construction for rotating the shaft with lighter operational force by rotating the outside ring by the contact between the pawl portion and the hole on the outside ring side wall.

According to the foregoing known torque transmission device with the construction for locking the outside ring and the inside ring by sandwiching the roller in the clearance between the outside ring and the inside ring, the respective rings and the roller are in line contact each other when the torque is transmitted from the outside ring to the inside ring via the roller. The large stress is generated because the load is concentrated on the contacted line portion. In addition, because the inside ring, the outside ring and the roller under operation contact each other at approximately the same position on every checking operations, the wear-out of the inside ring and the outside ring is increased.

A need thus exists for a torque transmission device which does not cause the concentration of the load applied to the inside ring and the outside ring and achieves high durability.

SUMMARY OF THE INVENTION

According to one aspect, A torque transmission device comprises an inside support member having a first contact surface portion positioned on an outer periphery of the inside support member, an outside support member having a second contact surface portion positioned on an inner periphery of the outside support member, a first holding portion in which a clearance between the first contact surface portion and the second contact surface portion is gradually decreased in one peripheral direction, a second holding portion in which a clearance between the first contact surface portion and the second contact surface portion is gradually decreased in the other peripheral direction, a pair of interposition members which is supported on the first holding portion and the second holding portion respectively, an elastic member positioned between the pair of interposition members for biasing each interposition member in a direction in which the each clearance of the first and the second holding portion is decreased, an operation member for moving one of the pair of interposition members in a direction for increasing the clearance of the first or the second holding portion against a biasing force of the elastic member.

Each interposition member comprises a third contact surface portion being in surface contact with the first contact surface portion and a fourth contact surface portion being in surface contact with the second contact surface portion.

According to another aspect, a torque transmission device comprises an inside support member having a first contact surface portion positioned on an outer periphery of the inside support member, an outside support member having a second contact surface portion positioned on an inner periphery of the outside support member, a first holding portion in which a clearance between the first contact surface portion and the second contact surface portion is gradually decreased in one peripheral direction, a second holding portion in which a clearance between the first contact surface portion and the second contact surface portion is gradually decreased in the other peripheral direction, a pair of interposition members which is supported on the first holding portion and the second holding portion respectively, an elastic member positioned between the pair of interposition members for biasing each interposition member to a direction in which the each clearances of the first holding portion and the second holding portion is,decreased, an operation member for moving, one of the pair of interposition members to a direction in which the clearance of the first or the second holding portion is increased against a biasing force of the elastic member, a gear formed on the inside support member for transmitting an operational force to an external device, a shaft inserted through the inside support member, the operation member, the outside support member, and an operation handle, for transmitting the operational force from the operational handle to the external device.

Each interposition member comprises a third contact surface portion being in surface contact with the first contact surface portion and a fourth contact surface portion being in surface contact with the second contact surface portion.

According to further aspect, a torque transmission device comprises an inside support member having a first contact surface portion positioned on an outer periphery of the inside support member, an outside support member having a second contact surface portion positioned on an inner periphery of the outside support member, a first inclined surface provided on the inside support member, the first inclined surface gradually increasing a height in one peripheral direction, a second inclined surface provided on the inside support member, the second inclined surface gradually increasing a height in the other peripheral direction, a pair of interposition members which are disposed on the first inclined surface and the second inclined surface, an elastic member positioned between the pair of interposition members for biasing each interposition member to a direction in which each clearances between the inside support member and the outside support member at the first and the second inclined surface is decreased, an operation member for moving one of the paired interposition members to a direction in which the clearance between the inside support member and the outside support member at the first and the second inclined surface is increased selectively against a biasing force of the elastic member, a gear formed on the inside support member for transmitting an operational force to an external device, a shaft inserted through the inside support member, the operation member, the outside support member, and an operation handle, for transmitting the operational force from the operational handle to the external device.

Each interposition member comprises a third contact surface portion being in surface contact with the first contact surface portion and a fourth contact surface portion being in surface contact with the second contact surface portion.

BRIEF DESCRIPTION OF THE DRAWING FIGURES

The foregoing and additional features and characteristics of the present invention will become more apparent from the following detailed description considered reference to the accompanying drawing figures in which like reference numerals designate like elements.

DETAILED DESCRIPTION OF THE INVENTION

Figure 1:
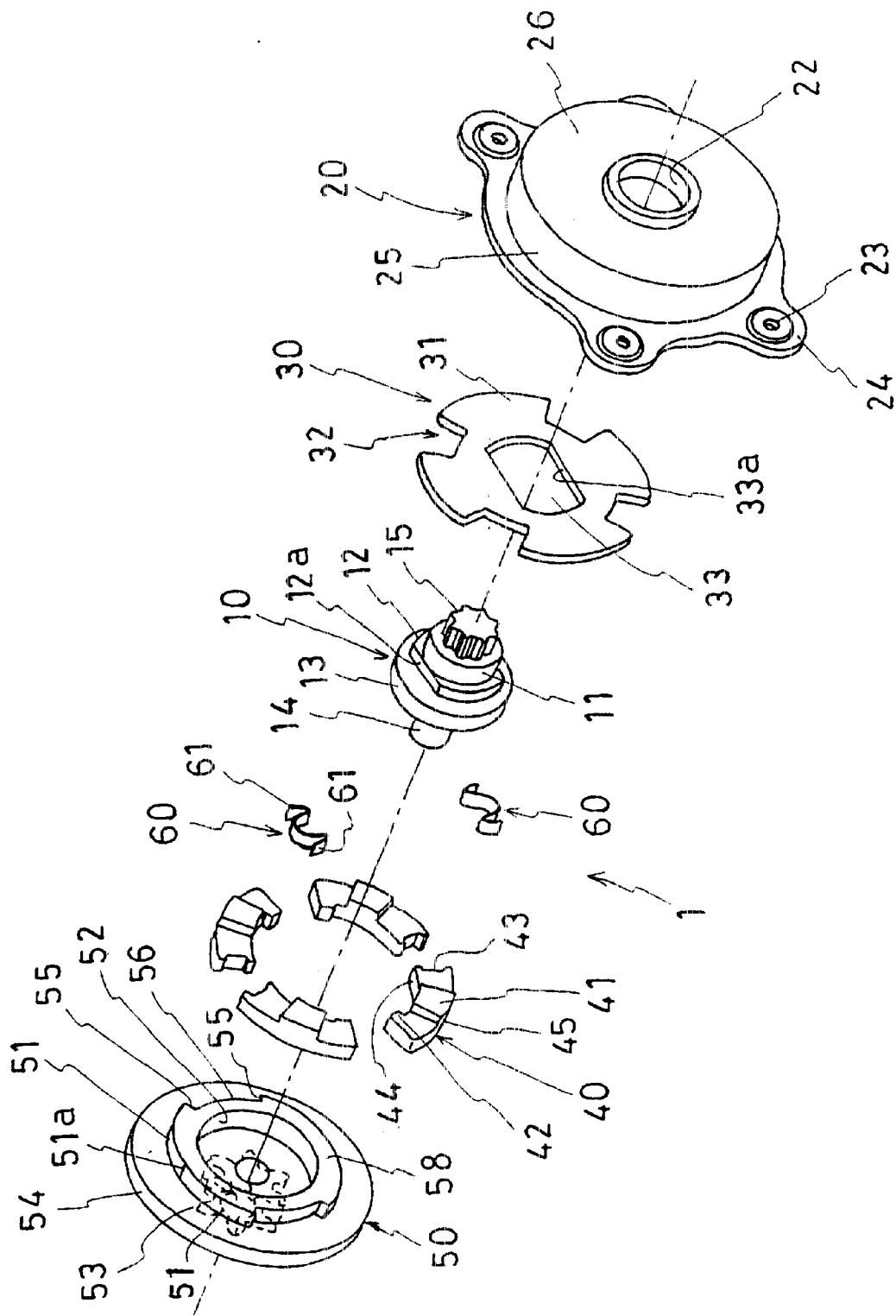
FIG. 1 is an exploded perspective view of a torque transmission device according to an embodiment of the present invention.

An embodiment of a torque transmission device according to the present invention will be explained referring to FIGS. 1–3 as follows.

A torque transmission device 1 includes a housing 20. The housing 20 is formed with a space portion 2 by a cylinder portion 25, one end thereof is blocked up with a longitudinal wall surface portion 26, and the other end thereof is open. A bearing hole 22 is formed on the central portion of the longitudinal wall surface portion 26. A flange portion 24 outwardly extended in radial direction is formed on the open end side of the cylinder portion 25. The flange portion 24 includes plural fitting holes 23 which are used for installing the torque transmission device 1 to an application device 80 (FIG. 3).

An operation plate 30 is positioned at a bottom portion closest to the longitudinal wall portion 26 in the back of the space portion 2 of the housing 20. The operation plate 30 is formed with a plane plate in a circular shape whose diameter is slightly smaller than an internal diameter of the cylinder portion 25. Four recess portions 32 with a predetermined width are provided on the periphery of the operation plate 30. A hole 33 is formed on the central portion of the operation plate 30. The hole 33 includes a pair of plane surfaces 33a which are opposed and in parallel each other.

A shaft 10 which is provided with a stepped portion 12 having portions 12a with plane surfaces in parallel each other so that the stepped portion 12 may be engaged with the hole 33 to fix the shaft 10 in the hole 33. The shaft 10 is inserted into the hole 33 and penetrating the bearing hole 22 of the housing 20. The shaft 10 is formed with a large diameter shaft portion 11 for rotatably supporting one side of the shaft 10 to the housing 20. The shaft 10 includes a projecting portion on one end portion formed with a serration 15 with plural slits extended in axial direction. The serration 15 projects to the outside of the housing 20 when the shaft 10 is assembled in the housing 20. An operation handle 90 (shown in FIG. 3) for operating the shaft 10 is fixed on the serration 15 by engaging another serration formed on an internal surface of the operation handle 90. A boss portion 13 contacting the stepped portion 12 is formed on the shaft 10. A small diameter shaft portion 14 is formed on the other end portion of the shaft 10 opposite to the serration 15.

A disc shaped inside support member 50 is positioned on the portion closest to the open end side of the space portion 2 of the housing 20. The external diameter of the inside support member 50 corresponds to the size which is fitted into the internal diameter surface 21 of the cylinder portion 25, of the housing 20 and is rotatably supported. A gear 53 is integratedly formed on one side surface of the inside support member 50 in axial direction to be projected to the outside of the space portion 2. The gear 53 is, for example, provided to be geared with an operational gear 70 of a seat height adjustment device 80 (shown in FIG. 3) for operating the seat height adjustment device 80. A ring portion 58 is formed on the other side surface of the inside support member 50 to be projected in axial direction in the space portion 2. The internal diameter of the ring portion 58 includes a shape for accommodating the boss portion 13 of the shaft 10. As shown in FIG. 2, the outer profile of the ring portion 58 includes four inclined surfaces 51 symmetric with respect to the center of the ring portion 58. The four inclined surfaces 51 are provided on the-top-right, top-left, bottom-right, and bottom-left of the ring portion 58 of FIG. 2. Two inclined surfaces 51, 51 on the right side of FIG. 2 make a pair of the inclined surfaces 51, 51 and the other two inclined surfaces 51, 51 on the left side of FIG. 2 make an another pair of inclined surfaces 51, 51. The inclined surfaces 51, 51 of the pair are connected via a connecting portion 51a therebetween. The inclined surfaces 51, 51 have the largest clearance relative to the internal diameter surface 21 of the cylinder portion 25 of the housing 20 at the position of connecting portions 51a. Each inclined surface 51 shown on the top right and on the bottom left of FIG. 2 has a shape whose clearance relative to the internal diameter surface 21 is gradually reduced in the counterclockwise direction. The clearance of each inclined surface 51 shown on the top left and on the bottom right of FIG. 2 relative to the internal diameter surface 21 is gradually reduced in the clockwise direction. In other words, the height of each inclined surface 51 in radial direction is gradually increased in the counterclockwise direction regarding the inclined surfaces 51, 51 on the top right and the bottom Left of FIG. 2. And the height of each inclined surface 51 in radial direction is gradually increased in the clockwise direction regarding the inclined surfaces 51, 51 on the top left and bottom right of FIG. 2. Peripheral length of each inclined surface 51 corresponds to a sector of 50 degrees. As shown in FIG. 2, a stepped diameter portion 56 with arc shaped surface is formed on a position closer to the center of the ring portion 58 compared to the inclined surface 51 between each pair of inclined surfaces 51, 51 positioned on the right and left of FIG. 2. A shoulder portion 55 is formed on the boarder between the inclined surface 51 and the stepped diameter portion 56.

Figure 2:
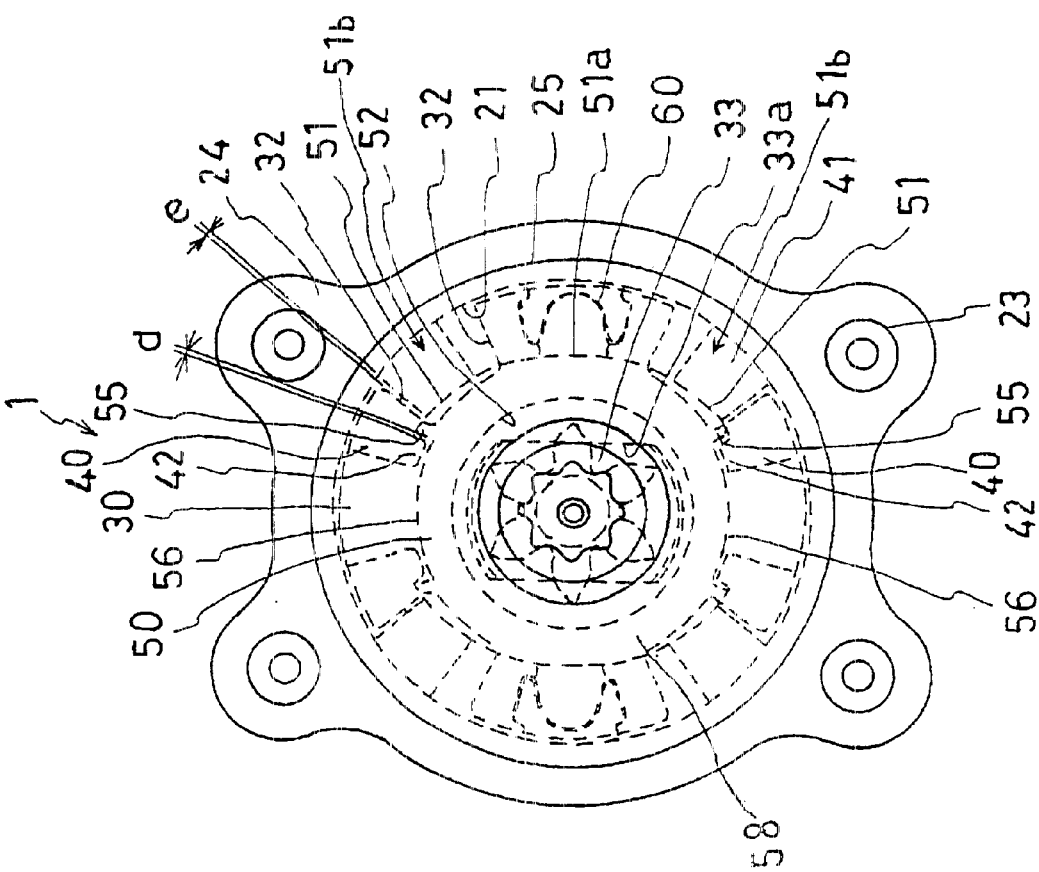
FIG. 2 is a plane view of the torque transmission device according to the embodiment of the present invention.
Figure 3:
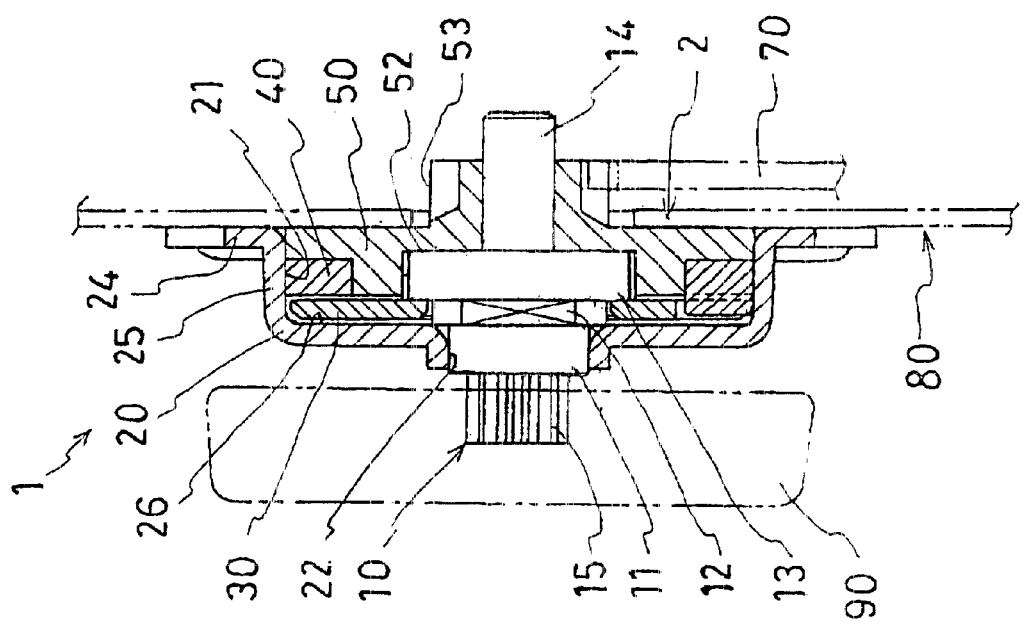
FIG. 3 is a cross-sectional view of a central portion of the torque transmission device according to the embodiment of the present invention.

As shown in FIG. 2, four interposition members 40 are placed in a holding portion 51b formed between the internal diameter surface 21 of the cylinder portion 25 of the housing 20 and each inclined surface 51. The interposition members 40 contact the inclined surfaces 51 for covering each pair of the inclined surfaces 51. Each interposition member 40 includes an inside contact surface 44 contacting the corresponding inclined surface 51 within the range up to approximately 40 degrees. A projecting portion 42 is formed on one end portion of the interposition member 40 which is engageable with the shoulder portion 55. Normally, the projecting portion 42 is positioned keeping a small clearance "d" from the shoulder portion 55. The interposition member 40 contacts on the inclined surface 51 and contacts on the internal diameter surface 21 by an outside contact surface 45. The interposition member 40 is tightly contacted on both of the inclined surface 51 and the internal diameter surface 21 simultaneously, because the interposition member 40 has a wedge shape whose width is gradually narrowed.

As shown in FIG. 2, springs 60 for affecting of increasing the distance between the paired interposition members 40 are positioned between the paired interposition members 40 between the outer surface of the ring portion 58 and the internal diameter surface 21 of the cylinder portion 25. The spring 60 is a W-shaped leaf spring, and is always pushing the interposition members 40 by contact portions 61 on the both sides of the spring 60 to the direction in which the clearance between the inclined surface 51 and the internal diameter surface 21 is decreased. The pushing force of the spring 60 generates the large pressing load on both of the ring potion 58 and the cylinder portion 25 by the wedge effect. Thus, the housing 20 and the ring portion 58 are strongly fixed via the interposition members 40 by the frictional force accompanied by the large pressing load.

Projections 41 projecting to be respectively inserted into four recess portions 32 formed on the periphery of the operation plate 30 is formed in the approximately center of the interposition members 40. The width of the projection 41 is narrower than the width of the recess portion 32. The projection 41 is positioned to be opposing to an end surface of the recess portion 32 keeping a small clearance "e" on one side and leaving the large clearance on the other side. Each clearance "e" is positioned for the operation plate 30 to contact one side of the projection 41 for pushing the interposition member 40 to the direction in which the clearance between the inclined surface 51 and the internal diameter surface 21 is increased. When the operation plate 30 is rotated to either the clockwise direction or the counterclockwise direction of FIG. 2 more than the angle corresponding to the clearance "e", the interposition member 40 is moved along the inclined surface 51 by the rotation of the operation plate 30. Then the tight contact between the inclined surface 51 and the internal diameter surface 21 is released because the interposition member 40 is pushed to the direction in which the clearance between the inclined surface 51 and the internal diameter surface 21 is increased.

As explained above, the operation handle 90 is connected to the operation plate 30 via the shaft 10. When the operation handle 90 is rotated, the operation plate 30 and one of the interposition members 40 of the paired interposition members 40, 40 are contacted to be rotated. Thus, the tight contact of one of the interposition members 40 of the paired interposition members 40, 40 relative to the inclined surface 51 and the internal diameter surface 21 is released. When one of the paired interposition members 40, 40 is moved by the clearance "d", the corresponding projection 42 provided on the interposition member 40 engages with the corresponding shoulder portion 55 of the ring portion 58 for rotating the ring portion 58 in the rotational direction of the operation handle 90. By the rotation of the ring portion 58 relative to the housing 20, the clearance between the inclined surface 51 and the internal diameter surface 21 which are sandwiching the other interposition member 40 of the paired interposition members 40, 40 which does not contact on the operation plate 30 increases. Thus, the tight contact of the other interposition member 40 of the paired interposition members 40, 40 relative to the inclined surface 51 and the internal diameter surface 21 is also released. Accordingly, the tight contact at all four positions is released. The gear 53 integratedly formed on the ring portion 58 can be rotated by the light rotational operation force by the operation handle 90.

The operation of the torque transmission device 1 with the forgoing construction applied to, for example, the seat height adjustment device 80. The seat height adjustment device 80 includes the gear 70 for operating the mechanisms (not shown) which is geared with the gear 53 of the torque transmission device 1. The occupant of the seat operates the operation handle 90 in order to achieve the appropriate seat height for rotating the gear 70 and for operating the mechanism of the seat height adjustment device 80. Load generated in the mechanism due to such as vibration during the vehicle running is transmitted to the gear 53, the appropriate height is maintained by the strong biding force between the interposition members 40 and the housing 20 and the ring portion 58 which construct the torque transmission device 1.

Although the seat height adjustment device 80 is applied in this embodiment, a window regulator device or other devices may be applied as the application device 80.

According to the torque transmission device of the embodiment of the present invention, because of the strong biding force of the inside support portion and the outside support portion relative to the interposition member which are contacted via surfaces, the generation of the large stress on the inside support portion, the outside support portion and the interposition member are prevented by avoiding the concentration of the load on the contact portions. Thus, the torque transmission device which excels in high durability with less wear-out is achieved. In addition, because the interposition member includes the integratedly formed engagement portion which is enagegable with the inside support portion, the number of the parts is reduced, thus the strong torque transmission device is achieved with less manufacturing cost.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A torque transmission device comprising:

an inside support member having a first contact surface portion positioned on an outer periphery of the inside support member;

an outside support member having a second contact surface portion positioned on an inner periphery of the outside support member;

a first holding portion in which a clearance between the first contact surface portion and the second contact surface portion is gradually decreased in one peripheral direction;

a second holding portion in which a clearance between the first contact surface portion and the second contact surface portion is gradually decreased in the other peripheral direction;

a pair of interposition members which is supported on the first holding portion and the second holding portion respectively;

an elastic member positioned between the pair of interposition members for biasing each interposition member to a direction in which the each clearance of the first and the second holding portion is decreased;

an operation member for moving one of the pair of interposition members to a direction in which the clearance of the first or the second holding portion is increased against a biasing force of the elastic member; wherein each interposition member comprises a third contact surface portion being in surface contact with the first contact surface portion and a fourth contact surface portion being in surface contact with the second contact surface portion.

2. A torque transmission device according to claim 1, wherein said each interposition member further comprises an engagement portion engaging with the inside support member for rotating the inside support member in the same direction to the operation member when one of the interposition members is moved in the direction in which the clearance of the first or the second holding portion is increased.

3. A torque transmission device according to claim 2, wherein said each interposition member further comprises a projection for engaging with the operation member.

4. A torque transmission device according to claim 1, wherein the first contact surface portion of the inside support member comprises an inclined surface whose height in radial direction is gradually increased in said one peripheral direction and the second contact surface portion of the inside support member comprises an inclined surface whose height in radial direction is gradually increased in said the other peripheral direction.

5. A torque transmission device comprising:

an inside support member having a first contact surface portion positioned on an outer periphery of the inside support member;

an outside support member having a second contact surface portion positioned on an inner periphery of the outside support member;

a first holding portion in which a clearance between the first contact surface portion and the second contact surface portion is gradually decreased in one peripheral direction;

a second holding portion in which a clearance between the first contact surface portion and the second contact surface portion is gradually decreased in the other peripheral direction;

a pair of interposition members which is supported on the first holding portion and the second holding portion respectively;

an elastic member positioned between the pair of interposition members for biasing each interposition member to a direction in which the each clearances of the first holding portion and the second holding portion is decreased;

an operation member for moving one of the pair of interposition members to a direction in which the clearance of the first or the second holding portion is increased against a biasing force of the elastic member;

a gear formed on the inside support member for transmitting an operational force to an external device;

a shaft inserted through the inside support member, the operation member, the outside support member, and an operation handle, for transmitting the operational force from the operational handle to the external device; wherein each interposition member comprises a third contact surface portion being in surface contact with the first contact surface portion and a fourth contact surface portion being in surface contact with the second contact surface portion.

6. A torque transmission device according to claim 5, wherein said each interposition member further comprises an engagement portion engaging with the inside support member on the pair of interposition members for rotating the inside support member in the same direction to the operation member when one of the interposition members is moved in the direction in which the clearance of the first or the second holding portion is decreased.

7. A torque transmission device according to claim 5, wherein said each interposition member further comprises a projection for engaging with the operation member.

8. A torque transmission device according to claim 5, wherein the first contact surface portion of the inside support member comprises an inclined surface whose height in radial direction is gradually increased in said one peripheral direction and the second contact surface portion of the inside support member comprises an inclined surface whose height in radial direction is gradually increased in said the other peripheral direction.

9. A torque transmission device according to claim 5, wherein the shaft comprises a small diameter shaft portion inserted into the inside support member, a boss portion inserted into the inside support member, a stepped portion having flat portions inserted into the operation member, a large diameter shaft portion inserted into the outside support member, and a serration engaged with the operation handle.

10. A torque transmission device according to claim 8, wherein the operation member further comprises plural recess portions for operatively connected with the projection of the interposition member.

11. A torque transmission device comprising:

an inside support member having a first contact surface portion positioned on an outer periphery of the inside support member;

an outside support member having a second contact surface portion positioned on an inner periphery of the outside support member;

a first inclined surface provided on the inside support member, the first inclined surface gradually increasing a height in one peripheral direction;

a second inclined surface provided on the inside support member, the second inclined surface gradually increasing a height in the other peripheral direction;

a pair of interposition members which are disposed on the first inclined surface and the second inclined surface;

an elastic member positioned between the pair of interposition members for biasing each interposition member to a direction in which each clearances between the inside support member and the outside support member at the first and the second inclined surface is decreased;

an operation member for moving one of the paired interposition members to a direction in which the clearance between the inside support member and the outside support member at the first and the second inclined surface is increased selectively against a biasing force of the elastic member;

a gear formed on the inside support member for transmitting an operational force to an external device;

a shaft inserted through the inside support member, the operation member, the outside support member, and an operation handle, for transmitting the operational force from the operational handle to the external device; wherein each interposition member comprises a third contact surface portion being in surface contact with the first contact surface portion and a fourth contact surface portion being in surface contact with the second contact surface portion.

12. A torque transmission device according to claim 11, wherein said each interposition member further comprises an engagement portion engaging with the inside support member on the pair of interposition members for rotating the inside support member in the same direction to the operation member when one of the interposition members is moved in the direction in which the clearance of the first or the second holding portion is decreased.

13. A torque transmission device according to claim 11, wherein said each interposition member further comprises a projection for engaging with the operation member.

14. A torque transmission device according to claim 11, wherein the shaft comprises a small diameter shaft portion inserted into the inside support member, a boss portion inserted into the inside support member, a stepped portion having flat portions inserted into the operation member, a large diameter shaft portion inserted into the outside support member, and a serration engaged with the operation handle.

15. A torque transmission device according to claim 11, wherein the operation member further comprises plural recess portions for operatively connected with the projection of the interposition member.

* * * * *